United States Patent
Li et al.

(10) Patent No.: US 10,432,036 B2
(45) Date of Patent: Oct. 1, 2019

(54) FOREIGN OBJECT DETECTION

(71) Applicant: NXP USA, Inc., Austin, TX (US)

(72) Inventors: Gang Li, ShangHai (CN); Fei Chen, Shanghai (CN); Yuanhui Liu, Suzhou (CN)

(73) Assignee: NXP USA, Inc., Austin, TX (US)

( * ) Notice: Subject to any disclaimer, the term of this patent is extended or adjusted under 35 U.S.C. 154(b) by 31 days.

(21) Appl. No.: 15/728,882

(22) Filed: Oct. 10, 2017

(65) Prior Publication Data

US 2018/0115197 A1     Apr. 26, 2018

(30) Foreign Application Priority Data

Oct. 26, 2016    (CN) .......................... 2016 1 0941519

(51) Int. Cl.
| | |
|---|---|
| *H02J 50/60* | (2016.01) |
| *H02J 50/12* | (2016.01) |
| *H02J 50/80* | (2016.01) |
| *H02J 7/02* | (2016.01) |
| *G01S 13/04* | (2006.01) |
| *H01F 38/14* | (2006.01) |
| *H02J 50/40* | (2016.01) |

(52) U.S. Cl.
CPC ............. *H02J 50/60* (2016.02); *H02J 50/12* (2016.02); *H02J 50/80* (2016.02); *G01S 13/04* (2013.01); *H01F 38/14* (2013.01); *H02J 7/025* (2013.01); *H02J 50/40* (2016.02)

(58) Field of Classification Search
CPC .. H02J 50/60; H02J 50/80; H02J 50/12; H02J 50/40; H02J 7/025; G01S 13/04; H01F 38/14

USPC .......................................................... 320/108
See application file for complete search history.

(56) References Cited

U.S. PATENT DOCUMENTS

| | | | |
|---|---|---|---|
| 8,796,886 B2 | 8/2014 | Tan | |
| 2013/0260677 A1* | 10/2013 | Partovi | ................... H01F 5/003 |
| | | | 455/41.1 |

OTHER PUBLICATIONS

Fukuda, Shinichi et al; "A Novel Metal Detector Using the Quality Factor of the Secondary Coil for Wireless Power Transfer Systems"; IEEE MTT-S Inter'l Microwave Workshop Series on Innovative Wireless Power Transmission, Kyoto, JP; pp. 241-244 (May 10-11, 2012).

Wireless Power Consortium; "System Description Wireless Power Transfer—vol. 1: Low Power, Part 1: Interface Definition, Version 1.1.2"; 186 pages (Jun. 2013) Uploaded in 2 parts.

* cited by examiner

Primary Examiner — M Baye Diao (57) ABSTRACT

A set of initialization parameters are generated for a wireless charging device. Parameters of an antenna circuit connected to an output of the control circuit are measured. The antenna circuit is modelled as first and second virtual antenna portions. The presence of a foreign object is detected by receiving, from a receiver device, characteristics for the antenna circuit and by measuring second parameters of the antenna circuit. The measured second parameters and the initialization parameters are used to determine characteristics for the first virtual antenna portion. A foreign object is detected based upon a comparison of the received characteristics for the antenna circuit and the determined characteristics for the first virtual antenna portion.

19 Claims, 7 Drawing Sheets

FOREIGN OBJECT DETECTION

Aspects of various embodiments are directed to detecting a foreign object in a wireless power-providing field.

A growing number of electrical devices use rechargeable battery technologies. These devices include mobile devices (e.g., tablets, smart phones, RFID tags, smart cards) for which it may be inconvenient to use a wired charging connection. Wireless power transfer (WPT) or wireless energy transmission allows for the transmission of electrical energy from a transmitter device to a receiver device without a physical wire. A particular type of WPT uses magnetic inductive coupling to transfer power between antenna coils of the transmitter and receiver devices. Applications of this type include electric toothbrush chargers, RFID tags, smart-cards, and chargers for implantable medical devices like artificial cardiac pacemakers, and inductive powering or charging of electric vehicles like trains or buses. The WPT-based standards and devices do not always conform to a consistent set of specifications and design parameters.

These and other matters have presented challenges to efficiencies of WPT implementations, for a variety of applications.

SUMMARY

Various example embodiments are directed to issues such as those addressed above and/or others which may become apparent from the following disclosure concerning foreign object detection in connection with wireless power transfer systems and devices.

Certain embodiments are directed toward method that includes generating a set of initialization parameters for a control circuit of a wireless charging device. The initialization parameters are generated by: measuring first parameters of an antenna circuit connected to an output of the control circuit; and modeling the antenna circuit as a first virtual antenna portion and a second virtual antenna portion by assigning predetermined characteristics to the first virtual antenna portion and determining characteristics of the second virtual antenna portion based upon the first parameters. The presence of a foreign object can then be detected by receiving, from a receiver device, characteristics for the antenna circuit; measuring second parameters of the antenna circuit; determining, by fixing the characteristics of the second virtual antenna portion, the characteristics for the first virtual antenna portion indicated by the second parameters; and detecting the foreign object based upon a comparison of the received characteristics for the antenna circuit and the characteristics for the first virtual antenna portion indicated by the second parameters.

Various embodiment of the present disclosure relate to a device for wireless charging of a remote device. The device includes a transmitter circuit configured to transmit power to the remote device; measure first parameters of an antenna circuit connected to an output of the control circuit; and model the antenna circuit as a first virtual antenna portion and a second virtual antenna portion by assigning predetermined characteristics to the first virtual antenna portion and determining characteristics of the second virtual antennal portion based upon the first parameters. The device is also configured to detect the presence of a foreign object by: receiving characteristics of the antenna circuit from a receiver device; measuring second parameters of the antenna circuit; determining characteristics for the first virtual antenna from the second parameters and by fixing the determined characteristics of the second virtual antenna portion; and identifying a foreign object by comparing the determined characteristics for the first virtual antenna with the characteristics received from the receiver device.

Embodiments of the present disclosure are directed toward a method for initializing a wireless charging station. The initializing includes measuring a first center frequency of an LC oscillator circuit that includes an antenna coil and a capacitor and determining a first quality (Q) factor of the LC oscillator circuit. The LC oscillator circuit is modelled as multiple virtual antenna portions by: setting a predetermined quality factor for a first virtual antenna portion of the multiple virtual antenna portions; and determining a set of initialization values for a second virtual antenna portion of the multiple virtual antenna portions using the first center frequency, the first quality factor and the predetermined quality factor. The presence of a foreign object is detected by: receiving a reference quality factor from a receiver device; measuring a second center frequency of the LC oscillator; determining a second quality factor of the LC oscillator; determining, based upon the measured second center frequency, second quality factor, and set of initialization values, a quality factor of the first virtual antenna portion; comparing the reference quality factor to the determined quality factor of the first virtual antenna portion; and identifying a foreign object based upon the results of the comparing.

The above discussion/summary is not intended to describe each embodiment or every implementation of the present disclosure. The figures and detailed description that follow also exemplify various embodiments.

BRIEF DESCRIPTION OF FIGURES

Various example embodiments may be more completely understood in consideration of the following detailed description in connection with the accompanying drawings, in which.

While various embodiments discussed herein are amenable to modifications and alternative forms, aspects thereof have been shown by way of example in the drawings and will be described in detail. It should be understood, however, that the intention is not to limit the disclosure to the particular embodiments described. On the contrary, the intention is to cover all modifications, equivalents, and alternatives falling within the scope of the disclosure including aspects defined in the claims. In addition, the term "example" as used throughout this application is only by way of illustration, and not limitation.

DETAILED DESCRIPTION

Aspects of the present disclosure are believed to be applicable to a variety of different types of apparatuses, systems and methods involving the detection of foreign objects using wireless signals. In certain implementations, aspects of the present disclosure have been shown to be beneficial when used in the context of devices designed for wireless power transfer. In some embodiments, differing antenna characteristics can be accounted for using an initialization procedure. While not necessarily so limited, various aspects may be appreciated through the following discussion of non-limiting examples which use exemplary contexts.

Accordingly, in the following description various specific details are set forth to describe specific examples presented herein. It should be apparent to one skilled in the art, however, that one or more other examples and/or variations of these examples may be practiced without all the specific details given below. In other instances, well known features have not been described in detail so as not to obscure the description of the examples herein. For ease of illustration and unless otherwise stated, the same reference numerals may be used in different diagrams to refer to the same elements or additional instances of the same element. Also, although aspects and features may in some cases be described in individual figures, it will be appreciated that features from one figure or embodiment can be combined with features of another figure or embodiment even though the combination is not explicitly shown or explicitly described as a combination.

Various embodiments of the present disclosure are directed toward the detection of foreign metallic objects within an electromagnetic field. Particular aspects are directed toward electromagnetic fields that are used to transfer power between two devices. A particular example of wireless power transfer involves devices that are in compliance with the standards of the wireless power consortium (WPC). For ease of discussion, various embodiments are discussed in the context of the WPC and associated requirements. The principles and embodiments discussed herein, however, can be applied in other contexts and with other standards.

According to embodiments of the present disclosure, a wireless power providing transmitter device is configured to perform an initialization procedure that involves the measurement of parameters for a connected antenna circuit (e.g., relating to the quality factor of the antenna circuit). The transmitter device uses the measured parameters to create models of the antenna circuit. The models can effectively partition the antenna circuit into two different virtual antenna portions. A first virtual antenna portion can be modeled using a set of predetermined characteristics for the portion. A second virtual antenna portion can be modeled based upon both the measured parameters and set of predetermined parameters. Consistent with specific implementations, the set of predetermined characteristics correspond to an ideal antenna circuit. The modeling of the second virtual antenna portion can represent deviations from the ideal antenna circuit.

The wireless-power-providing-transmitter device can also be configured to detect the presence of a foreign object using the modelling of the virtual antenna portions. The modelling can be based upon the receipt of measured antenna characteristics from a receiver device that is in communication with the transmitter device. The presence of a foreign object can change the parameters detected by the receiver device. According to certain implementations, the receiver device does not have knowledge of the actual characteristics (e.g., quality factor) for the antenna circuit of the transmitter device. For example, the receiver device may presume that the transmitter device has an ideal antenna circuit.

As part of the foreign object detection, the transmitter device can measure a second parameter of the antenna circuit. For example, the transmitter device can perform the same, or similar, set of measurements that were implemented during the initialization procedure. The transmitter device can then use the measured second parameters to determine the characteristics for the first virtual antenna portions. In particular, the transmitter device can set, or fix, the characteristics of the second virtual antenna portion based upon the values determined during the initialization procedure. The transmitter device can then detect the presence (or absence) of a foreign object based upon a comparison of the received characteristics for the antenna circuit and the characteristics for the first virtual antenna portion indicated by the second parameters.

According to particular embodiments, the measured parameters can relate to the quality factor and center resonant frequency of the antenna circuit. For example, the initialization procedure can determine the center resonant frequency of an inductive-capacitive (LC) resonance tank that forms part of the antenna circuit.

Figure 1:
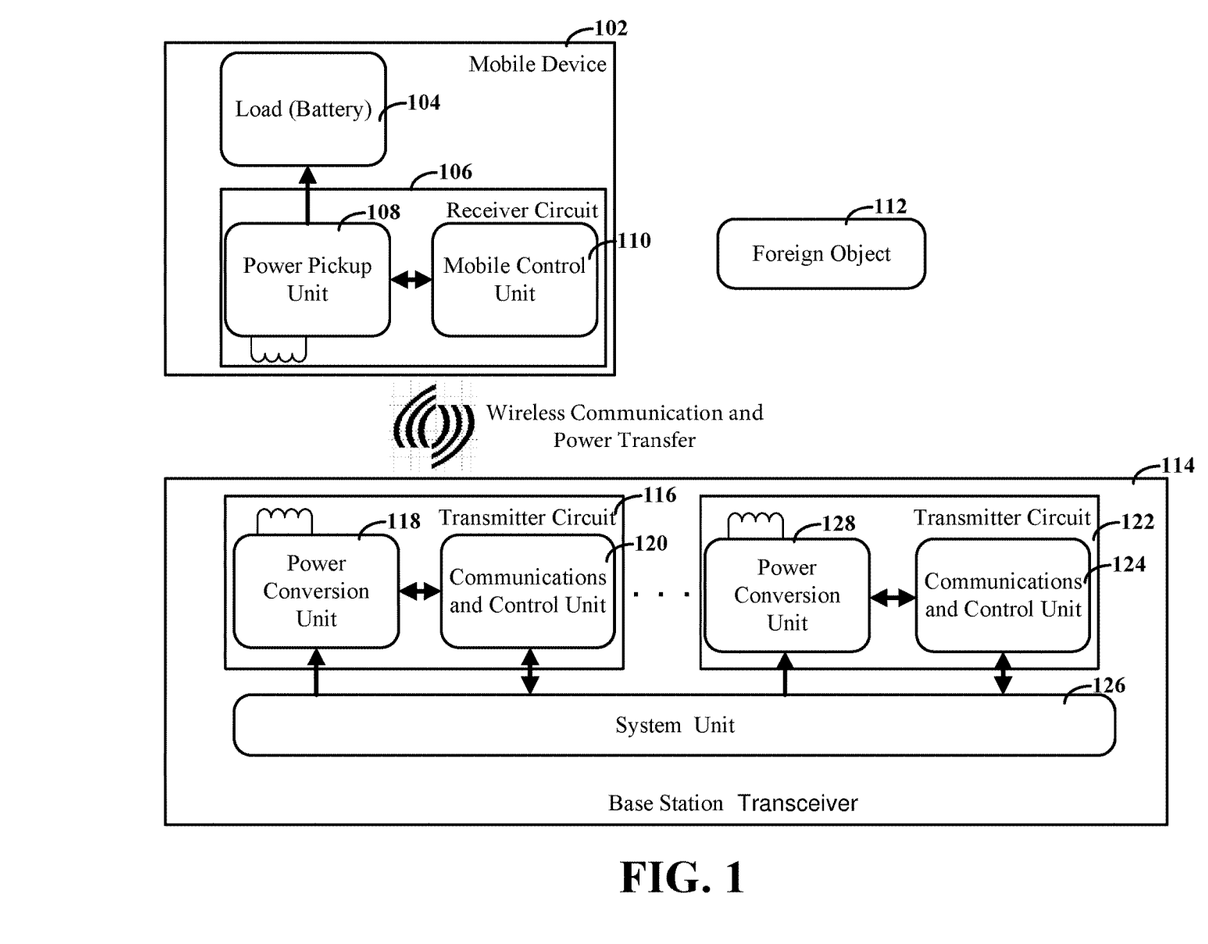
FIG. 1 depicts a block diagram of a system for providing wireless power between transmitter and receiver circuits and devices, consistent with embodiments of the present disclosure.

Turning now to the figures, FIG. 1 depicts a block diagram of a system for providing wireless power between transmitter and receiver circuits and devices, consistent with embodiments of the present disclosure. According to some embodiments, a base station (transmitter) device 114 can include one or more transmitter circuits 116 and 122 that work in conjunction with communications and control units 120, 124 to both communicate with and provide wireless power to one or more receiver devices, such as the depicted mobile device 102. A system unit 126 can coordinate the transmission of communications and power between multiple transmitter circuits.

In an example implementation, a power conversion unit 118, 128 can convert electrical energy to a wireless radio frequency (RF) signal that is transmitted over one or more antenna circuits of the transmitter circuits 116, 122. Mobile device(s) 102 can include a receiver circuit 106 that receives the wireless power and provides the power to a load 104 (e.g., a battery or other type of storage circuit). A power pickup unit 108 can convert the received wireless RF signal to power and, in combination with mobile control unit 110, also provide communication capabilities to and from the base station 114.

Consistent with various embodiments, the mobile device 102 and the base station 114 can communicate with one another in order to begin and end the wireless power transfer. This communication can be bidirectional or in one direction (e.g., from receiver to transmitter), depending upon the particular configuration. For instance, the mobile control unit 110 can be configured to communicate by modulation of the received RF signal. For example, the mobile control unit could change the effective load by changing a resistive load on the direct current (DC) side of the power pickup unit 108, or by changing a capacitive load on the alternating current (AC) side of the power pickup unit 108. Various different modulation and encoding schemes could be used.

According to certain embodiments, the mobile device 102 can be configured to communicate reference characteristics to the base station 114. In particular embodiments, the reference characteristics that represent characteristics (e.g., the quality factor) of an ideal transmitter circuit and coil when the mobile device is placed in communication with the ideal transmitter circuit. For example, a reference quality factor can be determined by measuring the quality factor when the mobile device is used with a transmitter circuit having an ideal antenna circuit (e.g., using a manufacturing test fixture). An example of an ideal antenna circuit is defined for WPC to be 24.8 uH, with a quality factor of 162.5 (both at 100 KHz). The presence of a hypothetical receiver might lower the quality factor to 130 at 100 Khz.

When the base station 114 is in communication with a mobile device 102, the base station 114 can initiate a foreign object detection (FOD) 112 routine. The FOD routine includes measuring a set of parameters for the antenna circuit. The parameters can then be used to determine a quality factor for the antenna circuit. In situations where the antenna circuit of the base station 114 is the same as, or very close to, the ideal antenna circuit, the base station 114 can directly compare the reference quality factor to a quality factor for the entire antenna circuit of the base station. If the compared quality factors differ by a significant (threshold) amount, this can indicate the presence of a foreign object 112 and the base station can enter a protected mode in which the transmission power is reduced or disabled.

Various embodiments of the present disclosure are directed toward an FOD routine that, in combination with an initialization procedure, provides compensation for non-ideal antenna circuits of the base station 114. The FOD routine uses multiple virtual antenna models to detect a deviation from the expected quality factor in the presence of a particular receiver device. In particular, the value of the second antenna portion, as determined in the initialization procedure, is fixed during the FOD routine. The quality factor value of the first antenna portion, which was fixed according to the ideal antenna parameters during the initialization procedure, is then determined based upon the current measured parameters. In the absence of a foreign object, the measured quality factor of the first antenna portion is expected to be near the reported/expected quality factor. Thus, a foreign object can be detected based upon a deviation from the expected quality factor.

Figure 2:
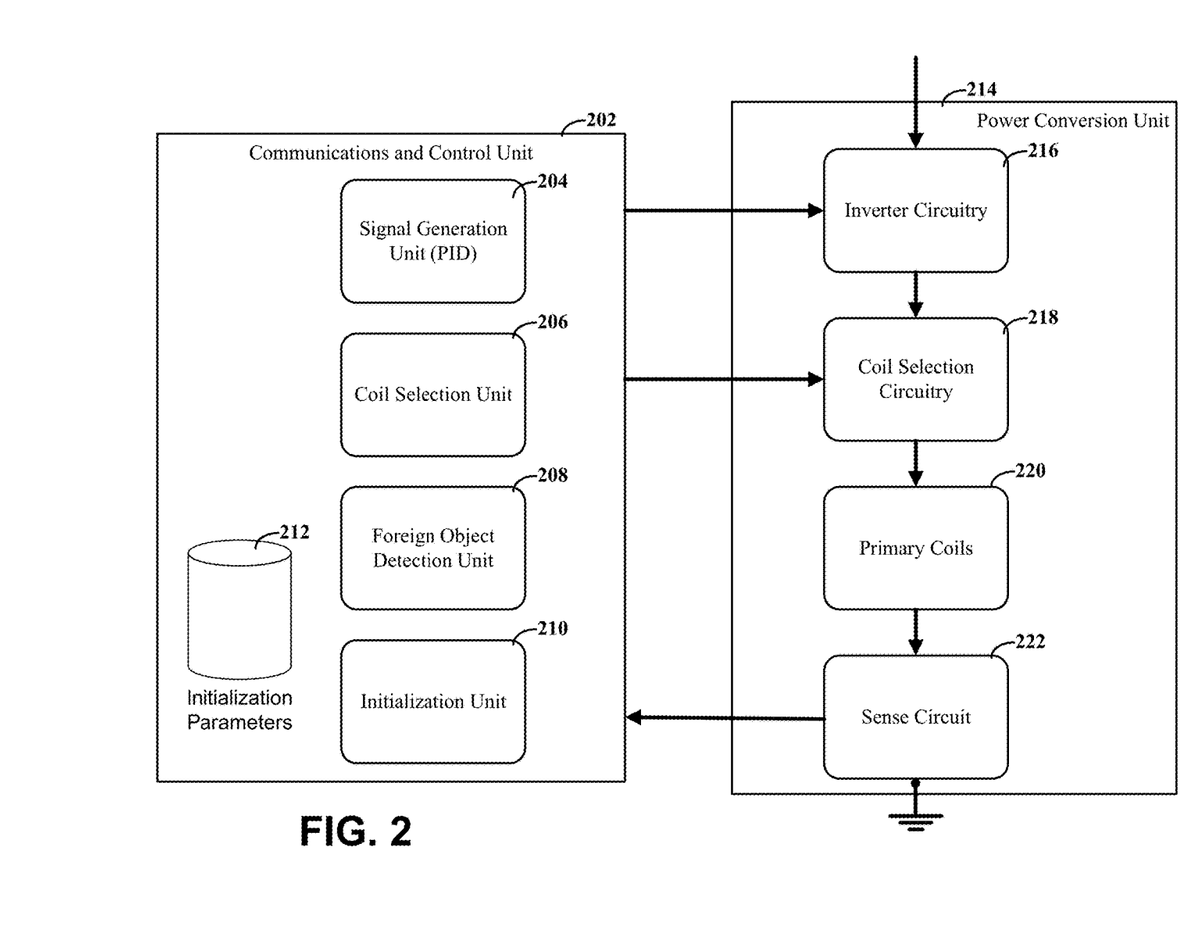
FIG. 2 depicts a block diagram of a communications control unit and a power conversion unit of a transmitter device, consistent with embodiments of the present disclosure.

FIG. 2 depicts a block diagram of a communications control unit and a power conversion unit of a transmitter device, consistent with embodiments of the present disclosure. In certain implementations, the communications and control unit 202 and power conversion unit 214 correspond to the similarly named units discussed in connection with FIG. 1. The communications and control unit 202 interfaces with the power conversion unit 214 to provide control over the transmission of power and the transmission and receipt of data communications. In particular embodiments, the power conversion unit 214 includes a number of analog components that are controlled by the communications and control unit 202. Under the control of the signal generation unit 204, the inverter circuitry 216 can convert a DC input from the transmitter device to an AC waveform that drives a resonant circuit. The resonant circuit can include the primary coils 220 and one or more capacitors, which can be connected in series to form an LC oscillator circuit. The sense circuit 222 can monitor parameters of the primary antenna circuit (coil), such as monitoring current, voltage (as measured across the capacitor or inductor/coil), or both.

Consistent with various embodiments, the communications and control unit 202 can include digital logic components that can receive and decode messages from a receiver device, carry out power control algorithms and protocols, and control the parameters used to drive the inverter 216 and to produce an AC waveform. For example, the parameters might include, but are not limited to, one or more of the frequency, input voltage, and duty cycle. The transmitter/base station can include a coil selection unit 206 that selects between different coils to use in transmission. For example, the coil selection circuitry 218 can include a number of different switches that allow for selective connection to different coils from the primary coils 220. The coil selection unit 206 can select which of the coils are connected to the inverter based upon detecting the presence of a receiver circuit in proximity to the corresponding coil.

According to various embodiments, the communications and control unit 202 can include an initialization unit 210. The initialization unit 210 can be configured to implement an initialization procedure that characterizes the antenna circuit(s) of the transmitter device according to one or more initialization parameters. In certain embodiments, the initialization procedure can be performed the first time the control unit 202 is powered up and the results can be stored in the memory storage circuit 212. In particular embodiments, the memory storage circuit 212 is a non-volatile memory circuit that maintains the stored initialization parameters in the absence of power. For example, the initialization unit 210 can run the initialization procedure when the transmitter circuit is powered up as part of the manufacturing and testing process. This helps to ensure that there are no unwanted external influences during the initialization procedure (e.g., from external metallic objects). The results can then be permanently stored and the initialization procedure does not get implemented again. In certain embodiments, the initialization procedure can be repeated. For example, the initialization procedure can be initiated by a service technician as part of a troubleshooting effort. The initialization procedure could also be periodically initiated to account for changes in the antenna properties that might occur over time.

Consistent with some embodiments of the present disclosure, the foreign object detection (FOD) unit 208 can be configured to implement an FOD procedure that measures and characterizes properties of the antenna circuit(s) of the transmitter device while the transmitter device is coupled to a receiver device. The presence of the receiver device can change the measured parameters for the antenna circuit of the transmitter, which can affect the quality factor of the antenna circuit. In particular, the receiver device can receive power by inductively coupling between the receiver device and the transmitter device. As discussed herein, the receiver device can communicate a reference quality factor to the transmitter device. The reference quality factor represents the expected quality factor of a transmitter antenna circuit that is coupled to the receiver device, assuming that the transmitter antenna circuit has the expected (ideal) transmitter characteristics.

According to particular embodiments of the present disclosure, the FOD procedure can account for non-ideal transmitter antenna circuits by modeling the antenna circuit as two separate antenna portions. As discussed herein, the parameters for a first antenna portion can be set to the ideal antenna values during the initialization procedure. The parameters for the second antenna portion can be set based upon parameters that were measured during the initialization procedure, while also modelling the antenna circuit as two separate portions. During the FOD procedure, the initialization parameters for the second antenna portion are kept at fixed values. A quality factor for the first antenna portion is then calculated by modeling the antenna circuit as the two separate antenna portions with the measured parameters representing the combination of the two antenna portions. In a particular example implementation, the measured parameters include the center resonant frequency and current or voltage in the primary coil of the transmitter.

Figure 3:
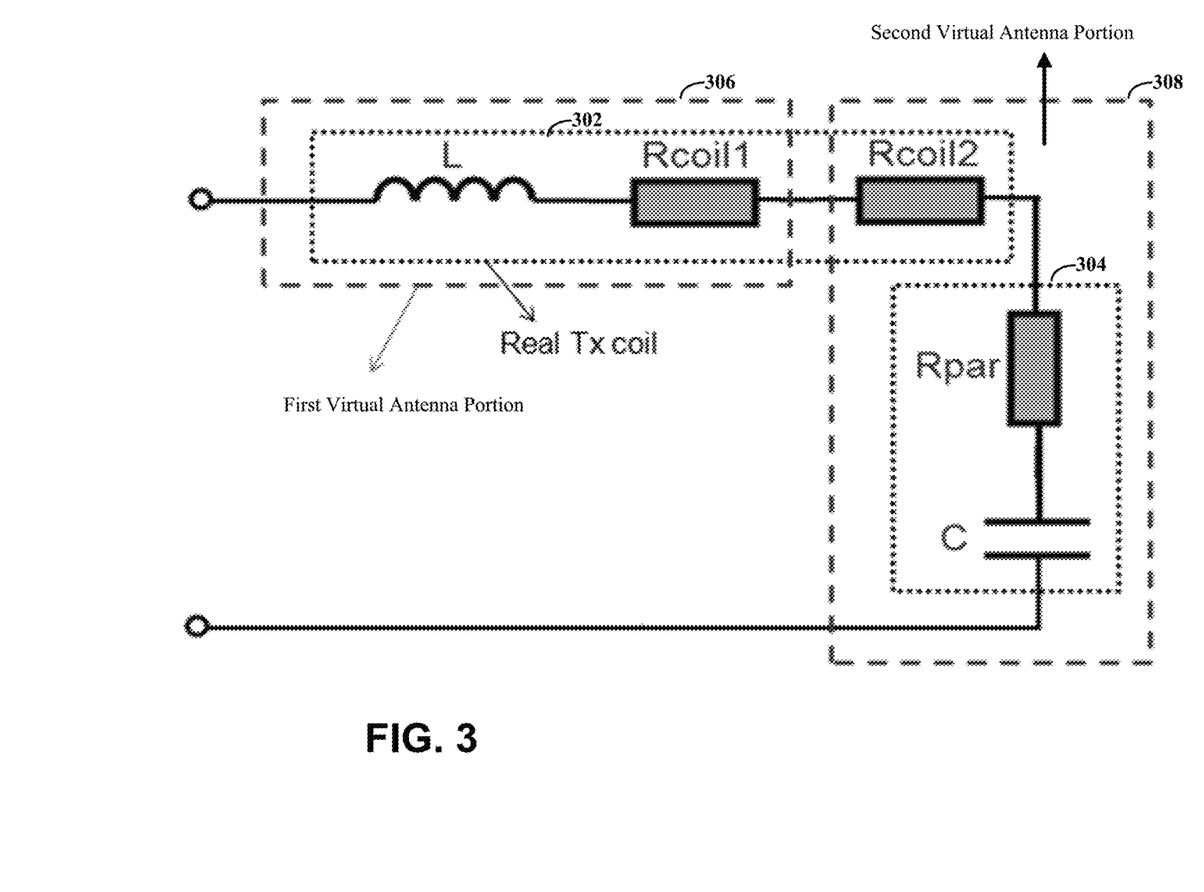
FIG. 3 depicts a circuit diagram of an antenna circuit that shows two virtual antenna portions, consistent with embodiments of the present disclosure.

FIG. 3 depicts a circuit diagram of an antenna circuit that shows two virtual antenna portions, consistent with embodiments of the present disclosure. The depicted antenna circuit can be used as part of a transmitter device that is consistent with one or more embodiments discussed herein. The depicted antenna circuit is a series connection of the antenna coil 302 and the capacitor 304, which forms an LC resonance tank circuit (or LC oscillator circuit). The circuit equivalent of the antenna coil 302 is represented by an inductor having an effective inductance (L) and two resistive portions having effective resistances (Rcoil1 and Rcoil2). Collectively, the resistive portions represent the total resistive impedance of the antenna coil 302. The depicted circuit equivalent of the series capacitor 304 includes a parasitic resistance (Rpar). The parasitic resistance can include, but is not limited to, the equivalent series resistance (ESR) of the capacitor 304. The circuit equivalent also depicts the effective capacitance (C) of the capacitor.

According to various embodiments of the present disclosure, a transmitter device can use an initialization unit to model the antenna circuit as the two virtual antenna portions 306 and 308. In particular, the second virtual antenna 308 includes the capacitor 304 as well as Rcoil2, which is a portion of the resistance for the real coil 302. The first virtual antenna 306 includes the inductance (L) of the coil and Rcoil1, which is only a portion of the resistance for the real coil 302. The initialization unit measures parameters of the antenna circuit (e.g., center resonant frequency and quality factor) without any receiver device or foreign object being present. The measured parameters are used in connection with predetermined set of the values for the first virtual antenna portion 306, which includes L and Rcoil1. The combined values of L and Rcoil1 are set to match the ideal antenna characteristics for a transmitter device (e.g., by determining the L value from the measurements and setting the Rcoil value accordingly). In particular, the combination of the L and Rcoil1 values can be set to match a predetermined quality factor for a transmitter antenna. As discussed herein, the predetermined quality factor can correspond to the quality factor of the transmitter antenna that is used by the receiver devices to determine the respective reference quality factors. The initialization unit then determines the value for components of the second virtual circuit (Rcoil2 and Rpar).

Consistent with embodiments of the present disclosure, the transmitter device can use an FOD unit to detect the presence of a foreign object. The FOD unit measures parameters of the antenna circuit (e.g., center resonant frequency and quality factor) while a receiver device is present and inductively coupled to the antenna circuit. The measured factors are then used to determine a quality factor for the first virtual antenna portion. This can include determining the effective inductive value (L) for the antenna coil based upon a known capacitance value (C) and the measured center resonant frequency. The measured parameters can also be used to determine the Rcoil1 value by also assuming that the values of the second virtual antenna (Rcoil2, Rpar, and C) remain fixed relative to the values determined during the initialization. The resulting quality factor for the first virtual antenna portion can then be compared against the reference quality factor provided by the receiver device in order to detect a foreign object (e.g., where the difference between the compared quality factors exceeds a threshold value).

Figure 4:
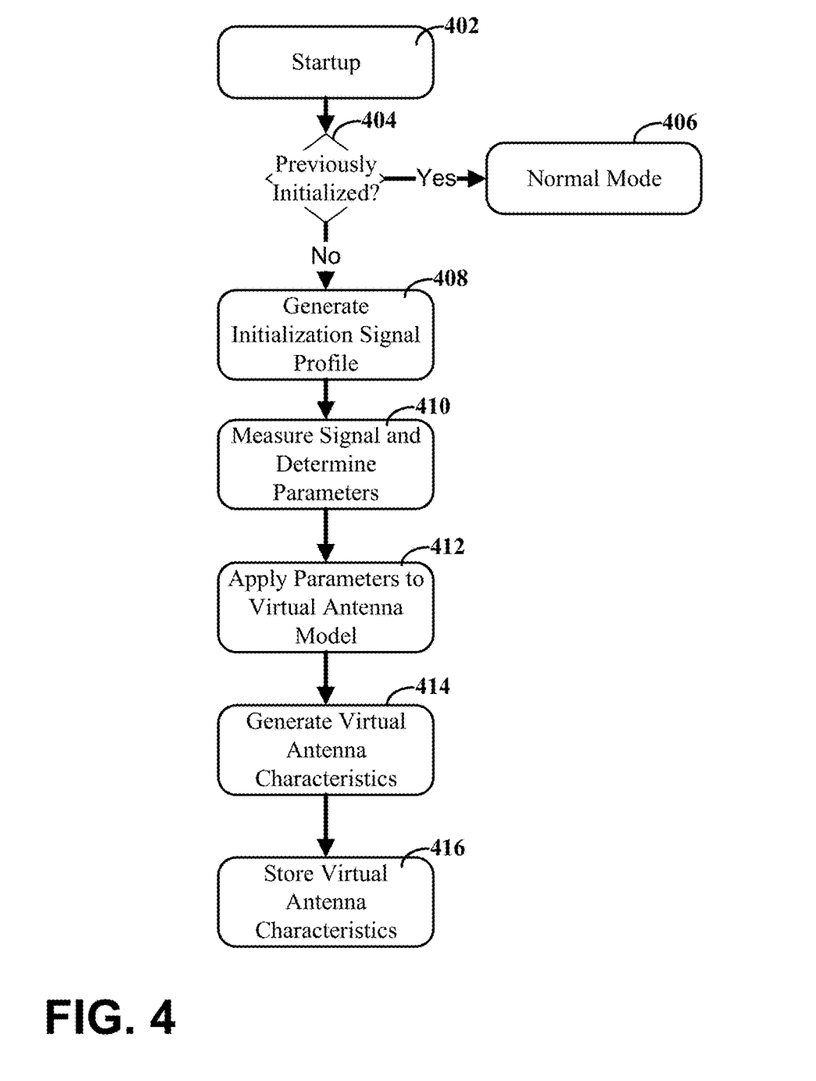
FIG. 4 depicts a flow diagram for an initialization procedure, consistent with embodiments of the present disclosure.

FIG. 4 depicts a flow diagram for an initialization procedure, consistent with embodiments of the present disclosure. Consistent with certain embodiments, a transmitter device can include an initialization unit that is configured to perform the initialization procedure a single time, which can occur during an initial manufacturing process of the device. After startup, indicated by block 402, the initialization unit can determine whether or not the initialization procedure has been previously completed, per block 404. If so, then the transmitter device can skip the initialization procedure and enter normal operation mode, per block 406. In certain embodiments, the determination of block 404 can include checking the contents a memory storage circuit that can contain the parameters generated by a previous initialization procedure. For example, the memory storage circuit can contain flag bit(s) that indicate the status of any prior initialization procedures. In certain embodiments, the decision of block 404 can be made based upon other factors. For example, an input signal to the initialization unit can indicate whether or not an initialization procedure should be carried out. The input signal could be provided by a variety of sources, such as a test fixture used by a manufacturer, by technician performing repairs, or from another unit of the transmitter device (e.g., as part of a periodic recalibration).

As discussed herein, the initialization procedure involves measurements that are taken for a set of parameters of the antenna circuit. Consistent with various embodiments, the measurements can be taken by first applying an initialization signal profile to the antenna circuit, per block 408. The initialization signal profile can include the application of excitation signals at a set voltage (e.g., 20 mV) in order to cause the LC tank circuit to oscillate. The response of the antenna circuit can be measured in both the time and frequency domains to determine the parameters (e.g., center resonant frequency and Q factor) of the antenna circuit, per block 410. For example, the antenna voltage, antenna current, or both, can be measured and used to determine a center resonant frequency and quality factor of the antenna circuit.

The determined parameters can then be applied to a virtual antenna model, per block 412. According to various embodiments, the virtual antenna model includes two virtual antenna portions, with each antenna portion including a portion of the total effective resistance of the antenna coil. Using the virtual antenna module, the initialization unit can determine characteristics of the virtual antenna portions, per block 414. Consistent with various examples discussed herein, the determination corresponding to block 414 can include setting the quality factor of the first antenna structure to a predetermined value and then using the measured parameters to determine the specific values for components of the virtual antenna model and the different virtual antenna portions of the model. The determined characteristics can then be stored in a memory circuit of the transmitter device, per block 416.

Figure 5:
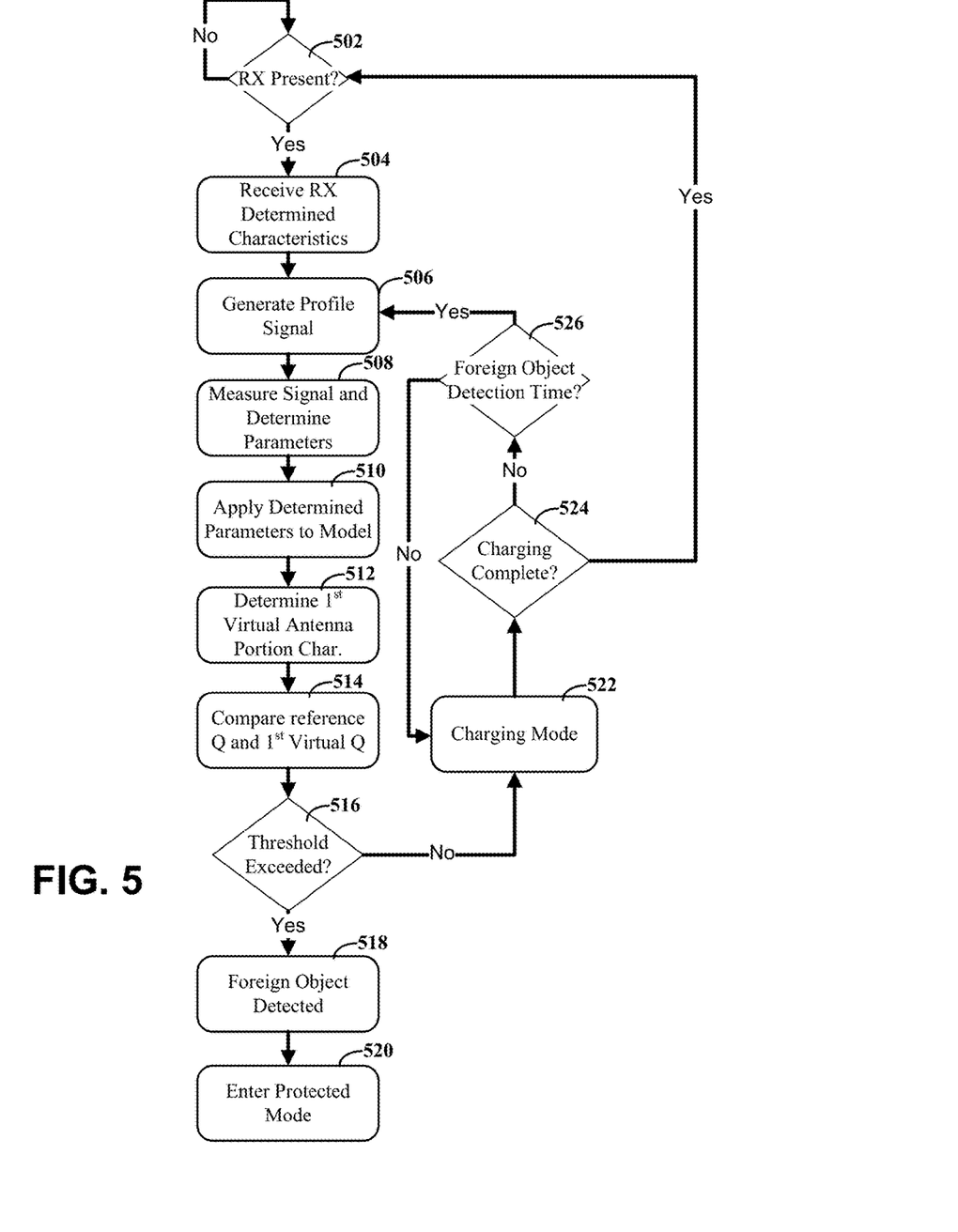
FIG. 5 depicts a flow diagram for a foreign object detection procedure, consistent with embodiments of the present disclosure.

FIG. 5 depicts a flow diagram for a foreign object detection procedure, consistent with embodiments of the present disclosure. According to various embodiments, the FOD procedure can be initiated by the FOD unit when the transmitter unit is generating an RF signal that provides power to a receiver device. This allows the FOD unit to protect against overheating, or other problems, that can be caused by a conductive foreign object finding its way into the RF field. Accordingly, the FOD unit can be configured to determine whether or not a receiver device (RX) is present before beginning the FOD procedure, per block 502.

According to various embodiments, the receiver device can transmit reference characteristic(s) to the transmitter device, per block 504. As a particular example, the receiver device transmits a reference quality factor by modulating the RF field generated by the transmitter device. The reference quality factor can represent the expected quality factor for an ideal transmitter device when inductively coupled to the receiver device. It is noted that transmission and receipt of the reference characteristics could occur at other points in the flow, while still being available for use in the comparison carried out in connection with block 514.

The FOD unit can then generate a profile signal that is applied to the antenna circuit, per block 506. For example, an excitation signal is presented to the antenna circuit, where the excitation signal has a signal profile that includes multiple different frequencies and a set voltage or current. The parameters of the resulting signal on the antenna circuit can then be measured in order to determine one or more parameters of the antenna circuit, per block 508. For example, the current or voltage of the antenna circuit can be measured to determine the center resonant frequency and quality factor.

The determined parameters (e.g., center resonant frequency and quality factor) can then be applied to the virtual antenna model, per block 510. Additionally, the parameters determined during the initialization can also be applied to the virtual antenna model. For example, one or more parameters (e.g., Rcoil2, Rpar, C) of the second virtual antenna model can be fixed according to the parameters determined during the initialization.

The FOD unit next determines the characteristics (e.g., quality factor) of the first virtual antenna portion based upon the model and the applied parameters, per block 512. For instance, the parasitic resistance (Rcoil1) and the inductance (L) of the first virtual antenna coil can be determined and used to calculate a quality factor for the first virtual antenna portion.

According to various embodiments, the FOD unit can compare the reference quality factor provided by the receiver device to the determined quality factor of the first virtual antenna portion, per block 514. For example, the comparison can be based upon a certain percentage difference (e.g., X % variation) or a strict numeric difference (e.g., +/−X difference). The FOD unit can then determine whether or not the resulting difference exceeds a threshold amount (e.g., 30%), per block 516. If the threshold amount is exceeded, then the FOD unit can determine that a foreign object is present and has been detected, per block 518. The FOD unit can then place the transmitter device into a protected mode 520. For instance, the FOD unit can send a FOD signal to the system unit, which can disable the RF signal completely, or reduce the RF signal strength to a safe level.

If the threshold is not exceeded, then the FOD unit can determine that there is no foreign object and that charging of the receiver device is allowable. This can result in the transmitter device entering a charging mode, per block 522. According to some embodiments of the present disclosure, the FOD detection can be repeated periodically during the charging mode in order to detect a foreign object that was introduced after the charging has started. The FOD detection can continue until the transmitter device determines that the charging is complete, as indicated by the decision block 524. While the charging is still ongoing, the transmitter device can use the FOD unit to repeat the FOD procedure, as indicated by the decision block 526. For example, the FOD procedure could be repeated at a regular time interval.

Figure 6:
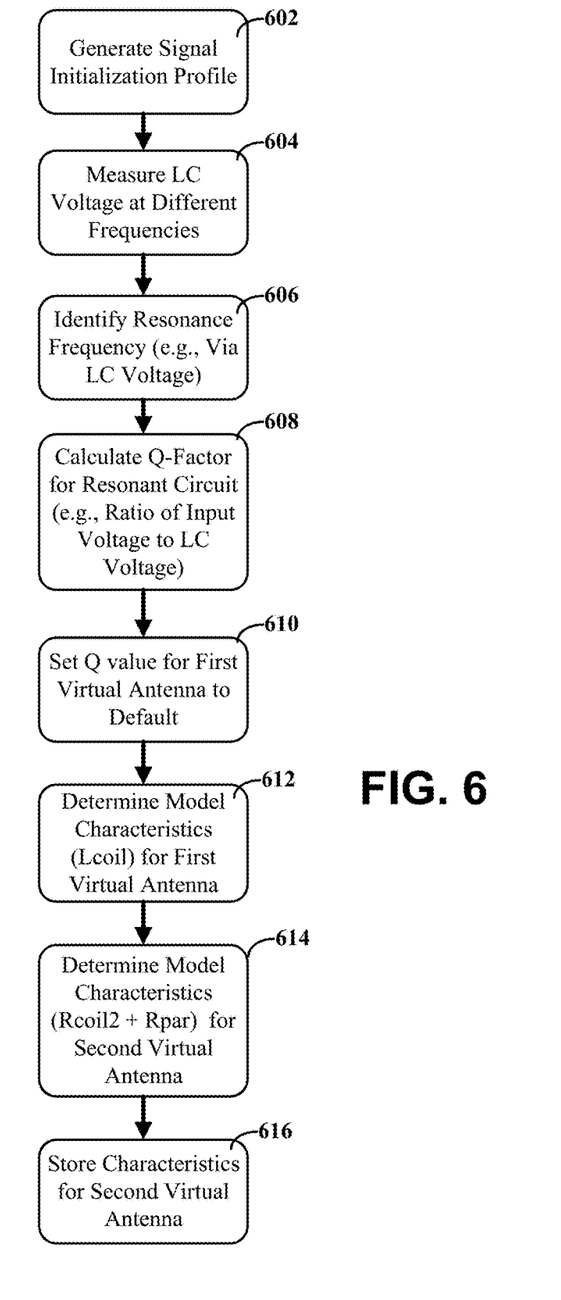
FIG. 6 depicts a flow diagram for a particular initialization procedure, consistent with embodiments of the present disclosure.

FIG. 6 depicts a flow diagram for a particular initialization procedure, consistent with embodiments of the present disclosure. The flow diagram of FIG. 6 provides a specific example implementation and is not meant to be limiting. The depicted flow starts with the generation of a signal initialization profile that is applied to the antenna circuit, per block 602. As discussed herein, the signal initialization profile can be designed to allow for the center resonant frequency and quality factor of the antenna circuit to be determined. For example, the signal initialization profile can specify a direct current (DC) excitation voltage that is applied to the antenna circuit (which includes an LC tank circuit). The voltage (or current) on the antenna circuit can be measured relative to different frequencies, per block 604. For instance, a frequency filter can be used to measure the voltage or current on the antenna across different frequencies. For example, a digital to analog converter (ADC) circuit can be used to measure the voltage and/or current on the LC tank circuit at a particular sampling frequency. The resulting data can then be used to determine the center resonant frequency by identifying the frequency at which the highest voltage or current are present, per block 606. The quality factor can then be determined based upon the ratio of the excitation voltage to the measured voltage (or current), per block 608. It is noted that there are different techniques that can be used to identify the center resonant frequency and quality factor. For sake of brevity, all possible techniques are not discussed herein.

The initialization unit next sets the quality factor of a first virtual circuit portion to a predetermined value, per block 610. The predetermined value corresponds to the ideal quality factor of a transmitter antenna. For example, the WPC specifies that the quality factor of a transmitter antenna be 162.5 at 100 Khz, with no intervening objection near the antenna coil. As indicated by block 612, the initialization unit can use the measured center resonant frequency to determine the inductance of the coil (Lcoil) by using the following formula: $Fp=1/(2*\pi*\sqrt{Lcoil*C}) \Rightarrow Lcoil$, where Fp is the center resonant frequency of LC tank; C is the capacitance of capacitor in LC tank (a known/pre-defined parameter), and Lcoil is the inductance of the inductor in LC tank. In addition to Lcoil, the initialization unit can determine the Rcoil1 for the first virtual antenna portion using the formula: $Qs=2*\pi*Ft*Lcoil/Rcoil1 \Rightarrow Rcoil1$, where Qs is the Q factor of an ideal Tx coil (e.g., a pre-defined parameter of 162.5 for WPC), Ft is the frequency used by the receiver device to create the reference Q factor (e.g., a pre-defined parameter of 100 KHz for WPC), Lcoil was determined per the prior formula, and Rcoil1 is the resistive impedance of the first virtual antenna portion.

The initialization unit next determines the characteristics of the second virtual antenna portion per block 614. For instance, the initialization unit can determine the sum of the Rcoil2 and Rpar values using the following formula: $Qlc=2*\pi*Fp*Lcoil/(Rcoil1+Rcoil2+Rpar) \Rightarrow Rcoil2+Rpar$, where Qlc is the measured Q factor of the LC resonance tank, Fp is the measured center resonant frequency of LC tank, Lcoil and Rcoil1 can be determined as previously noted. The determined values can then be stored for future use, per block 616.

Figure 7:
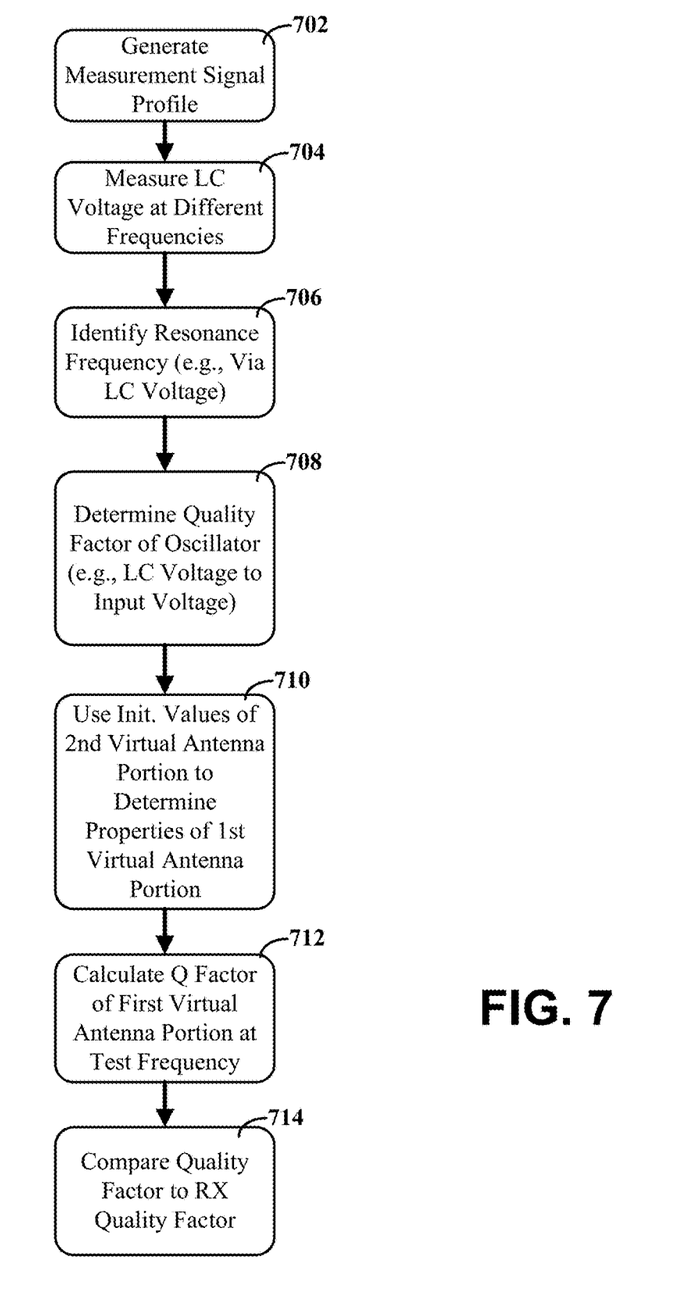
FIG. 7 depicts a flow diagram for a particular FOD procedure, consistent with embodiments of the present disclosure.

FIG. 7 depicts a flow diagram for a particular FOD procedure, consistent with embodiments of the present disclosure. The flow diagram of FIG. 7 provides a specific Example Implementation that can be Carried Out by an FOD Unit and is not Meant to be limiting. The depicted flow starts with the generation of a measurement signal profile, the measurement of LC voltage or current at different frequencies, and the identification of a center resonant frequency per blocks 702, 704, and 706, respectively. The FOD unit uses this information to determine the quality factor of the LC oscillator of the antenna circuit (Qlcm), per block 708. The specifics of these aspects are consistent with the discussion of the similar aspects discussed in connection with FIG. 6 and elsewhere. They are not repeated for the sake of brevity.

The FOD unit can then use the stored initialization values (Rpar+Rcoil2) for the second virtual antenna circuit to determine properties for the first virtual antenna circuit, per block 710. For example, the coil inductance during the calibration (Lcoilm) can be determined using the formula: $Fpm=1/(2*\pi*\sqrt{Lcoilm*C}) \Rightarrow Lcoilm$, where the subscript "m" differentiates the values during the FOD procedure from the corresponding values during the initialization procedure. Moreover, the resistive impedance of the first virtual antenna portion during the FOD flow (Rcoilm) can be calculated using the formula: $Qlcm=2*\pi*Fpm*Lcoilm/(Rcoil1m+Rcoil2+Rpar) > Rcoil1m$. Qlcm is the measured quality factor of the LC resonant tank, as determined per block 708. LCoilm is determined as noted above and the values for Rcoil2+Rpar were determined during the initialization procedure, as discussed herein.

The FOD unit also calculates the quality factor for the first virtual antenna portion, relative to the test frequency (Ft), per block 712. As discussed herein, the test frequency can be the same frequency that is used by the receiver device to determine the reference quality factor (e.g., 100 KHz for WPC). For example, the quality factor of the first antenna portion can be calculated using the formula:

$$Qcoilm=2*\pi*Ft*Lcoilm/Rcoil1n \Rightarrow Qcoilm.$$

The reference quality factor provided by the receiver device can then be compared to the determined quality factor (Qcoilm), per block 714. Consistent with various embodiments, the comparison can be carried out relative to a corresponding threshold value for FOD (e.g., by calculating a percentage difference or a relative/absolute difference in the compared quality factors).

It is noted that measuring and calculating the precise values of each of the parameters is often not realistic or possible due to practical limitations. For example, the center resonant frequency may only be calculable to within a certain degree of accuracy. The presence of such inaccuracies is implicit in the discussions herein and fall within the contemplated embodiments.

For the purposes of this document, the following terms and definitions apply: "Quality factor" is a parameter that describes how under-damped an oscillator or resonator is, and can be used to characterize a resonator's bandwidth relative to its center resonant frequency. "Center resonant frequency" is the frequency at which the output gain of a circuit is at a maximum.

The present disclosure describes and/or illustrates aspects useful for implementing the claimed disclosure by way of various circuits or circuitry, which may be illustrated and discussed in terms of blocks, modules, devices, systems, units, and/or other circuit-type depictions (e.g., FIGS. 1 and 2 depict systems and units). For example, in certain of the above-discussed embodiments, one or more items discussed in this context represent circuits (e.g., discrete logic circuitry, computer processor circuits, or (semi-)programmable circuits) configured and arranged for implementing operations/activities, as may be carried out in the approaches shown in connection with the disclosed embodiments and figures. In certain embodiments, such illustrated items represent computer circuitry which is understood to include a processor circuit connected to memory circuitry that stores code that includes a set/sets of instructions to be executed by the processor circuit (e.g., a CPU). The code can specify how the processing circuit is to perform a basic algorithm or the more complex process/algorithm as described to perform the related functions, operations, activities, etc.

Based upon the above discussion and illustrations, those skilled in the art will readily recognize that various modifications and changes may be made to the various embodiments without strictly following the exemplary embodiments and applications illustrated and described herein. For example, methods as exemplified in the Figures may involve steps carried out in various orders, with one or more aspects of the embodiments herein retained, or may involve fewer or more steps. For instance, the measurements and determinations relating to a center resonant frequency can be carried out using techniques not expressly described. Such modifications do not depart from the true spirit and scope of various aspects of the disclosure, including aspects set forth in the claims

What is claimed is:

1. A method comprising:
generating a set of initialization parameters for a control circuit of a wireless charging device by:
measuring first parameters of an antenna circuit connected to an output of the control circuit; and
modeling the antenna circuit as a first virtual antenna portion and a second virtual antenna portion by assigning predetermined characteristics to the first virtual antenna portion and determining characteristics of the second virtual antenna portion based upon the first parameters; and
detecting the presence of a foreign object by:
receiving, from a receiver device, reference characteristics for the antenna circuit;
measuring second parameters of the antenna circuit;
determining, by fixing the characteristics of the second virtual antenna portion, the characteristics for the first virtual antenna portion indicated by the second parameters; and
detecting the foreign object based upon a comparison of the reference characteristics for the antenna circuit and the characteristics for the first virtual antenna portion indicated by the second parameters.

2. The method of claim 1,
wherein the first and second parameters of the antenna circuit include a center frequency and a quality factor of the antenna circuit.

3. The method of claim 1,
wherein the predetermined characteristics assigned to the first virtual antenna portion include a quality factor.

4. The method of claim 3,
wherein the reference characteristics include a reference quality factor.

5. The method of claim 1,
wherein the measuring first and second parameters of the antenna circuit includes applying an excitation signal to cause the antenna circuit to oscillate.

6. The method of claim 5,
wherein the antenna circuit forms an LC oscillator circuit and the measuring the first and second parameters further includes and measuring a voltage or current of the LC oscillator circuit to determine a quality factor of the antenna circuit.

7. The method of claim 1,
wherein the first virtual antenna portion includes a portion of a parasitic resistance of an antenna coil of the antenna circuit.

8. The method of claim 7,
wherein the second virtual antenna includes another portion of the parasitic resistance of the antenna coil.

9. The method of claim 7,
wherein the characteristics of the second virtual antenna portion include another portion of the parasitic resistance of the antenna coil and a parasitic resistance of a capacitor of the antenna circuit.

10. A device for wireless charging of a remote device, the device comprising:
a transmitter circuit configured to:
transmit power to the remote device;
measure first parameters of an antenna circuit connected to an output of the control circuit; and
model the antenna circuit as a first virtual antenna portion and a second virtual antenna portion by assigning predetermined characteristics to the first virtual antenna portion and determining characteristics of the second virtual antennal portion based upon the first parameters; and
detect the presence of a foreign object by:
receiving reference characteristics of the antenna circuit from a receiver device;
measuring second parameters of the antenna circuit;
determine characteristics for the first virtual antenna from the second parameters and by fixing the determined characteristics of the second virtual antenna portion; and
identifying a foreign object by comparing the determined characteristics for the first virtual antenna with the characteristics received from the receiver device.

11. The device of claim 10,
wherein the first and second parameters of the antenna circuit include a center frequency and a quality factor of the antenna circuit.

12. The device of claim 10,
wherein the predetermined characteristics assigned to the first virtual antenna portion include a quality factor.

13. The device of claim 12,
wherein reference characteristics include a reference quality factor.

14. The device of claim 10,
wherein the control circuit is further configured to measure first and second parameters of an antenna circuit by applying an excitation signal to cause the antenna circuit to oscillate.

15. The device of claim 14,
wherein the antenna circuit forms an LC oscillator circuit and
wherein the control circuit is further configured to measure the first and second parameters by measuring a voltage or current of the LC oscillator circuit and to determine a quality factor of the antenna circuit based upon the measured voltage.

16. The device of claim 10,
wherein the first virtual antenna portion includes a portion of a parasitic resistance of an antenna coil of the antenna circuit.

17. The device of claim 16,
wherein the second virtual antenna includes another portion of the parasitic resistance of the antenna coil.

18. The device of claim 16,
wherein the characteristics of the second virtual antenna portion include another portion of the parasitic resistance of the antenna coil and a parasitic resistance of a capacitor of the antenna circuit.

19. A method comprising:
initializing a wireless charging station by:
measuring a first center frequency of an LC oscillator circuit that includes an antenna coil and a capacitor;
determining a first quality (Q) factor of the LC oscillator circuit;
modeling the LC oscillator circuit as multiple virtual antenna portions by
setting a predetermined quality factor for a first virtual antenna portion of the multiple virtual antenna portions; and
determining a set of initialization values for a second virtual antenna portion of the multiple virtual antenna portions using the first center frequency, the first quality factor and the predetermined quality factor; and
detecting the presence of a foreign object by:
receiving a reference quality factor from a receiver device;
measuring a second center frequency of the LC oscillator;
determining a second quality factor of the LC oscillator;
determining, based upon the measured second center frequency, second quality factor, and set of initialization values, a quality factor of the first virtual antenna portion;
comparing the reference quality factor to the determined quality factor of the first virtual antenna portion; and
identifying a foreign object based upon the results of the comparing.

* * * * *